United States Patent [19]

Uchinishi

[11] Patent Number: 4,622,928
[45] Date of Patent: Nov. 18, 1986

[54] EXHAUST CONTROL SYSTEM FOR TWO-CYCLE ENGINE

[75] Inventor: Eizaburo Uchinishi, Hyogo, Japan

[73] Assignee: Kawasaki Jukogyo Kabushiki Kaisha, Japan

[21] Appl. No.: 713,544

[22] Filed: Mar. 19, 1985

[30] Foreign Application Priority Data

May 23, 1984 [JP] Japan .................. 59-104996

[51] Int. Cl.$^4$ .............................................. F02B 75/02
[52] U.S. Cl. ............................ 123/65 PE; 123/190 A
[58] Field of Search .......... 123/65 PE, 80 BB, 190 A, 123/65 R, 65 V, 65 P

[56] References Cited

U.S. PATENT DOCUMENTS

| | | | |
|---|---|---|---|
| 1,154,479 | 9/1915 | Briney | 123/80 BB |
| 1,174,818 | 3/1916 | Bubar | 123/80 BB |
| 1,179,632 | 4/1916 | Irvine | 123/80 BB |
| 2,008,186 | 7/1935 | Fink | 123/190 A |
| 4,121,552 | 10/1978 | Mithuo et al. | 123/65 PE |

FOREIGN PATENT DOCUMENTS

| | | | |
|---|---|---|---|
| 2250017 | 5/1975 | France | 123/190 A |
| 52-132916 | 10/1977 | Japan . | |
| 59-7059 | 2/1983 | Japan . | |

Primary Examiner—Craig R. Feinberg
Assistant Examiner—David A. Okonsky
Attorney, Agent, or Firm—Leydig, Voit & Mayer, Ltd.

[57] ABSTRACT

An exhaust control system for a two-cycle engine wherein the cross-sectional area of an exhaust is controlled in accordance with the rpm. of the engine by opening and closing at least one auxiliary exhaust passage with respect to a main exhaust passage. The main exhaust passage and the auxiliary exhaust passage connected to the cylinder are located parallel to each other circumferentially of the cylinder, and the rotary valve in the form of a shaft disposed parallel to the center line of the cylinder is operative to open and close the auxiliary exhaust passage with respect to the main exhaust passage in accordance with an increase and a decrease in the engine speed.

10 Claims, 8 Drawing Figures

EXHAUST CONTROL SYSTEM FOR TWO-CYCLE ENGINE

FIELD OF THE INVENTION

This invention relates to an exhaust control system for a two-cycle engine mounted to a motorcycle, etc.

DESCRIPTION OF THE PRIOR ART

Figure 8:
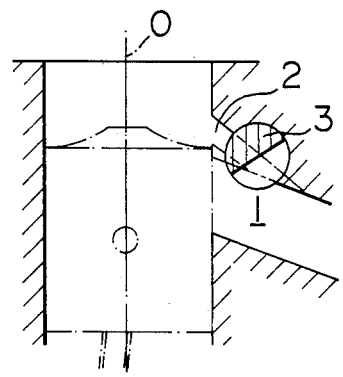
FIG. 8 is a vertical sectional view of an exhaust control system of the prior art for a two-cycle engine.

FIG. 8 shows an exhaust control system of the prior art for a two-cycle engine comprising a main exhaust passage 1, an auxiliary exhaust passage 2 and a rotary valve 3 having a shaft disposed normal to a center line 0 of a cylinder of the engine. The rotary valve 3 is operative to open and close the auxiliary exhaust passage 2 with respect to the main exhaust passage 1. More specifically, the rotary valve 3 operates such that it successively opens the auxiliary exhaust passage 2 with respect to the main exhaust passage 1 as the engine speed increases so as to provide an improved output power of the engine in a high engine speed range by causing the cross-sectional area of an exhaust of the engine to match the engine characteristic in the high engine speed range.

The exhaust control system of the prior art of the aforesaid construction would suffer the disadvantages that since the rotary valve 3 is disposed normal to the center line 0 of the cylinder, difficulties are experienced in arranging the auxiliary exhaust passage 2 at one side of the main exhaust passage 1 disposed circumferentially of the cylinder, and great limitations are placed on the area of opening of the valve 3.

SUMMARY OF THE INVENTION

This invention has been developed for the purpose of obviating the aforesaid disadvantages of the prior art. Accordingly, the invention has as its object the provision of an exhaust control system for a two-cycle engine capable of providing an improved output power of the engine in a high engine speed range while enabling rotary valves for opening and closing auxiliary exhaust passages to have an opening of an area large enough to perform an auxiliary exhaust passage opening and closing operation satisfactorily.

In the exhaust control system according to the invention, at least one auxiliary exhaust passage is formed at one side of a main exhaust passage circumferentially of a cylinder of the engine, and at least one rotary valve for adjustably opening and closing the auxiliary exhaust passage which is in the form of a shaft parallel to a center line of the cylinder is rotatably mounted between the main exhaust passage and the auxiliary exhaust passage. The rotary valve operates such that it closes the auxiliary exhaust passage with respect to the main exhaust passage when the engine is in a low engine speed range and it successively opens the auxiliary exhaust passage with respect to the main exhaust passage as the engine speed increases, to thereby cause the cross-sectional area of an exhaust to match the engine characteristic in a high engine speed range.

Other and further objects, features and advantages of the invention will appear more fully from the following description of preferred embodiments.

DESCRIPTION OF THE PREFERRED EMBODIMENTS

Preferred embodiments will now be described by referring to the accompanying drawings.

Figure 1:
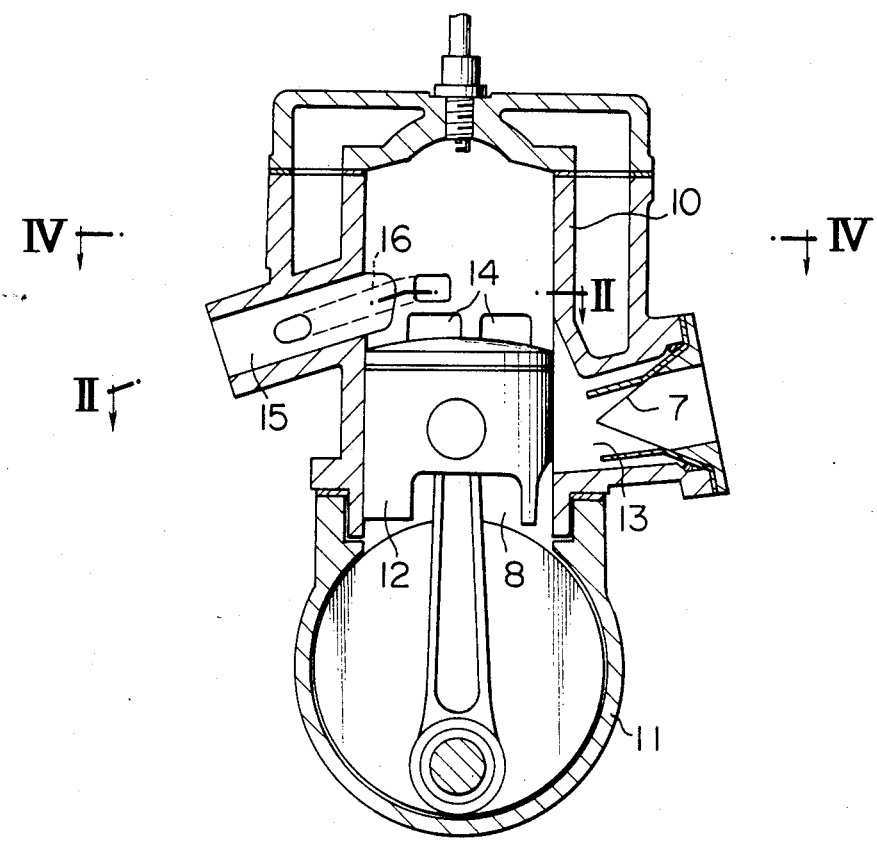
FIG. 1 is a vertical sectional view of a two-cycle engine incorporating therein a first embodiment of the exhaust control system in conformity with the invention.

Referring to FIG. 1, a cylinder 10 has a piston 12 slidably fitted therein, and is formed with a suction passage 13, a scavenging passage 14 and a main exhaust passage 15. The suction passage 13 is provided with a reed valve 7 and opened and closed by the piston 12 as the latter moves in vertical sliding movement with respect to a crank chamber 8 enclosed by a crank case 11. The scavenging passage 14 opens at its lower end in the crank chamber 8 and has its upper end opened and closed with respect to the cylinder 10 by the piston 12 as the latter moves in vertical sliding movement.

Figure 2:
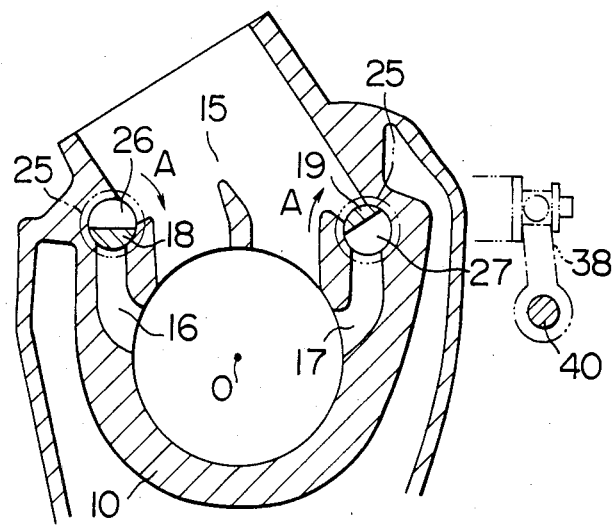
FIGS. 2 and 3 are sectional views taken along the line II—II in FIG. 1, showing the two-cycle engine shown in FIG. 1 in a low engine speed range and in a high engine speed range, respectively.

Referring to FIG. 2 which is a sectional view taken along the line II—II in FIG. 1, a first auxiliary exhaust passage 16 and a second auxiliary exhaust passage 17 are located at opposite sides of the main exhaust passage 15 circumferentially of the cylinder 10. The first and second auxiliary exhaust passages 16 and 17 independently open at one end thereof in the cylinder 10, and a first rotary valve 18 and a second rotary valve 19 for adjustably opening and closing the first auxiliary exhaust passage 16 and second auxiliary passage 17, respectively, at an opposite end thereof, are mounted to bring the auxiliary exhaust passages 16 and 17 into and out of communication with the main exhaust passage 15 in an intermediate portion of the latter.

The two rotary valves 18 and 19 are each in the form of a shaft located parallel to the center line 0 of the cylinder 10 and supported by a respective valve boss 25 of the cylinder 10 for rotation. The rotary valves 18 and 19 are formed with cutout passages 26 and 27, respectively.

Figure 4:
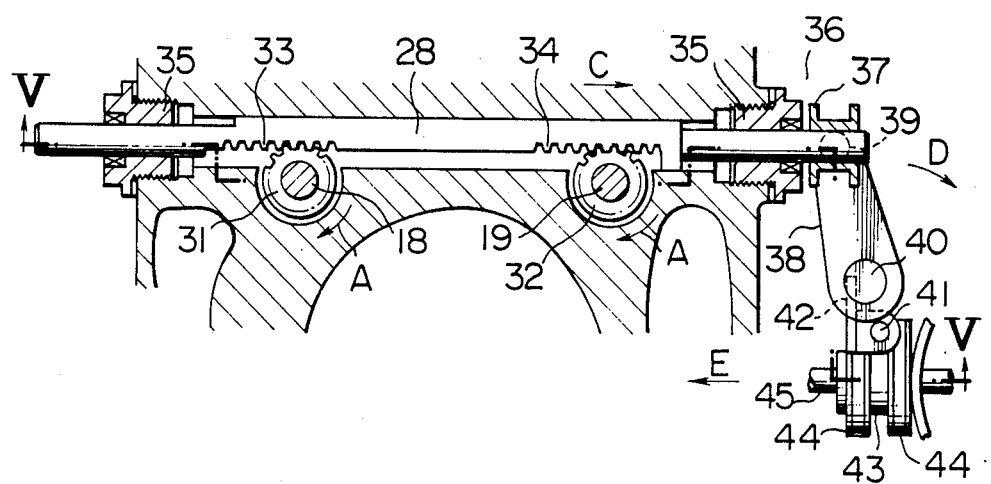
FIG. 4 is a sectional view taken along the line IV—IV in FIG. 1.

Referring to FIG. 4, the rotary valves 18 and 19 are located at one side of a rack shaft 28 and have pinions 31 and 32 attached thereto, respectively, to provide two unitary structures. The pinions 31 and 32 are maintained in meshing engagement with serrations 33 and 34, respectively, of the rack shaft 28 which is supported by bosses 35 for movement in an axial direction and extends into a transmission chamber 36. A portion of the rack shaft 28 extending into the transmission chamber 36 has a pair of adjusting plates 37, and a vertical pin 39 of a pivotal arm 38 extends between the two adjusting plates 37 into engagement therewith. The pivotal arm 38 is secured to a vertical rotary shaft 40.

The rotary shaft 40 has secured to a lower end portion thereof an arm 42 having a vertical pin 41 which is held between a pair of annular adjusting plates 44 of a slider 43. The slider 43 which is fitted over a governor rotary shaft 45 for axial sliding movement causes, as it moves axially in sliding movement, the rotary shaft 40 to rotate via the plates 44, pin 41 and arm 42.

Figure 5:
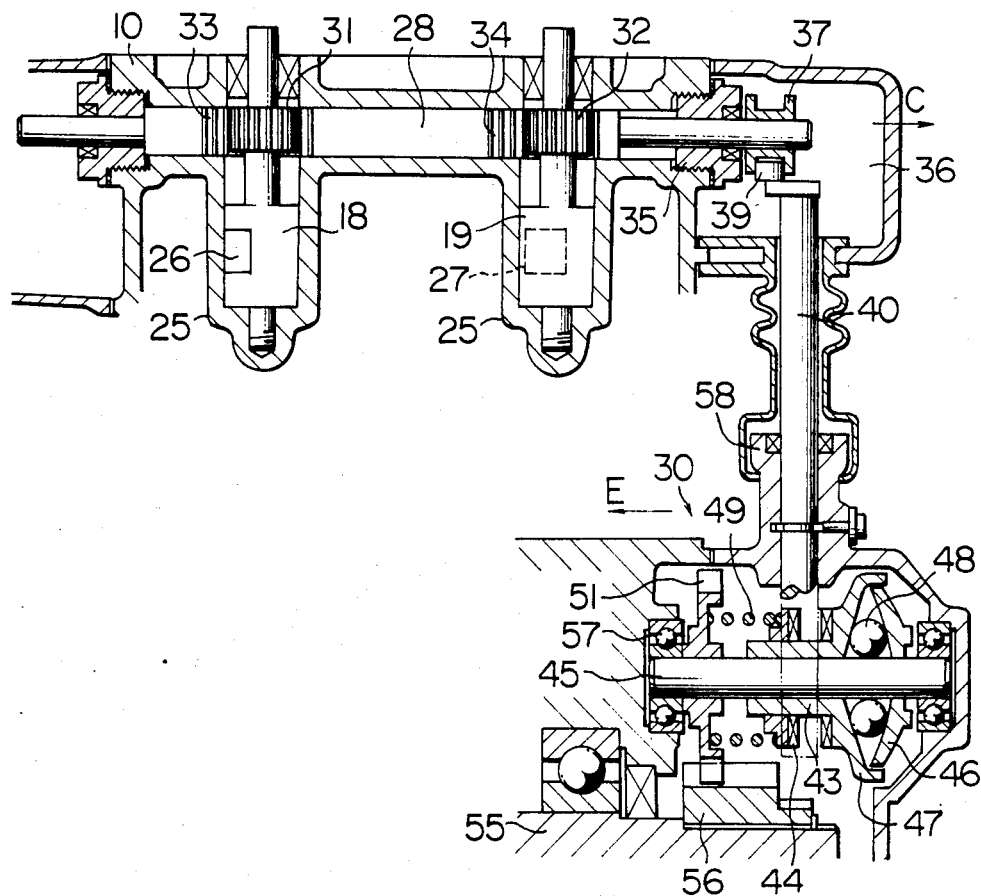
FIG. 5 is a sectional view taken along the line V—V in FIG. 4.

In FIG. 5 which is a sectional view taken along the line V—V in FIG. 4, governor means 30 comprises a pair of dish-shaped concave-surface plates 46 and 47, a plurality of centrifugal balls 48 held between the two dish-shaped concave-surface plates 46 and 47 and a governor spring 49 to constitute what is usually referred to as centrifugal ball type governor means. The concave-surface plate 47 is formed integrally with the slider 43 described hereinabove. The governor spring 49 which is mounted in compressed condition between the adjusting plate 44 and a governor drive gear 51 biases the concave-surface plate 47 in a direction opposite the direction indicated by an arrow E via the adjusting plate 44. The governor drive gear 51 is secured to the governor rotary shaft 45, journalled by a bearing 57, and meshes with a crank gear 56 of a crankshaft 55. A boss member 58 supports the vertical rotary shaft 40 for rotation.

The operation of the first embodiment of the exhaust control system constructed as described hereinabove will be described. When the engine operates in a low engine speed range, no great centrifugal forces act on the centrifugal balls 48 shown in FIG. 5 and the slider 43 does not move in sliding movement in the direction indicated by the arrow E. This keeps the two rotary valves 18 and 19 in a condition shown in FIG. 2 in which the auxiliary exhaust passages 16 and 17 are fully closed with respect to the main exhaust passage 15. Thus, the cross-sectional area of an exhaust from the cylinder 10 corresponds to the cross-sectional area of the main exhaust passage 15 at this time, which matches the characteristic of the engine in a low engine speed range.

As the engine speed rises, the rotational speed of the governor rotary shaft 45 shown in FIG. 5 also rises. This causes the centrifugal forces exerted on the balls 48 to increase until they overcome the biasing force of the governor spring 49, so that the balls 48 forces the slider 43 which is integral with the concave-surface plate 47 to move in sliding movement in the direction indicated by the arrow E. This sliding movement of the slider 43 causes, via the pin 41 and arm 42 shown in FIG. 4, the vertical rotary shaft 40 to rotate in a direction indicated by an arrow D in FIG. 4, to thereby cause, via the arm 38 and pin 39, the rack shaft 28 to shift in a direction indicated by an arrow C in FIG. 4. The movement of the rack shaft 28 in the direction indicated by the arrow C causes the two rotary valves 18 and 19 shown in FIG. 2 to rotate in directions indicated by respective arrows A in FIG. 2, so that the two auxiliary exhaust passages 16 and 17 are successively opened with respect to the main exhaust passage 15.

Thus, the cross-sectional area of an exhaust from the cylinder 10 which is equal to the cross-sectional area of the main exhaust passage 15 when the engine operates in a low engine speed range gradually increases as the cross-sectional areas of open portions of the two auxiliary exhaust passages 16 and 17 increase, until the cross-sectional area of the exhaust becomes equal to the cross-sectional area of the main exhaust passage 15 plus the cross-sectional areas of the two auxiliary exhaust passages 16 and 17 and matches the characteristics of the engine operating in a high engine speed range. This is conducive to improved output power of the engine.

Figure 3:
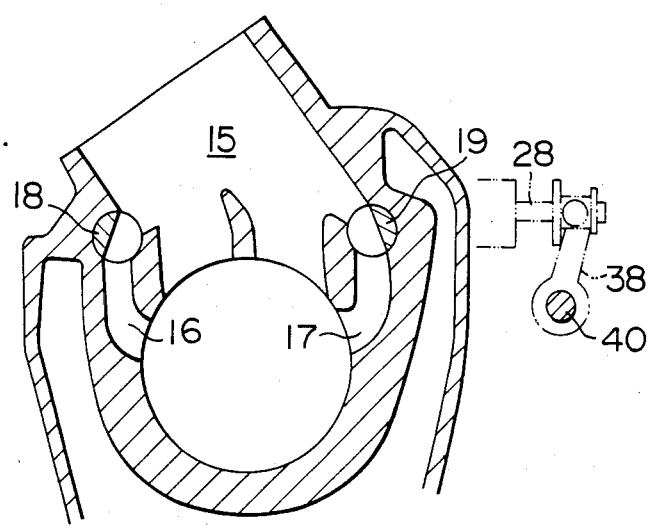

More specifically, when the engine overruns or its speed reaches a high level, the two auxiliary exhaust passages 16 and 17 are fully open with respect to the main exhaust passage 15 as shown in FIG. 3, with a result that the cross-sectional area of an exhaust emission from the cylinder 10 which becomes equal to the cross-sectional area of the main exhaust passage 15 plus the cross-sectional areas of the two auxiliary exhaust passages 16 and 17 is maximized and matches the characteristic of the engine overrunning or operating at the highest engine speed. With the two auxiliary exhaust passages 16 and 17 on opposite sides of the main exhaust passage 15 being fully open, control of the exhaust performed by the exhaust emission control system according to the invention achieves excellent effects in increasing the output power of the engine.

Figure 6:
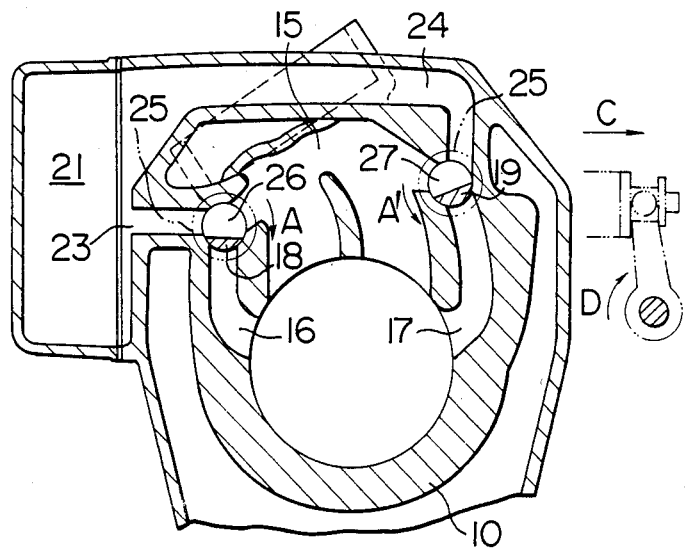
FIGS. 6 and 7 are transverse sectional views corresponding to the sections taken along the lines II—II and IV—IV, respectively, in FIG. 1 but showing a two-cycle engine incorporating therein a second embodiment of the exhaust control system in conformity with the invention.
Figure 7:
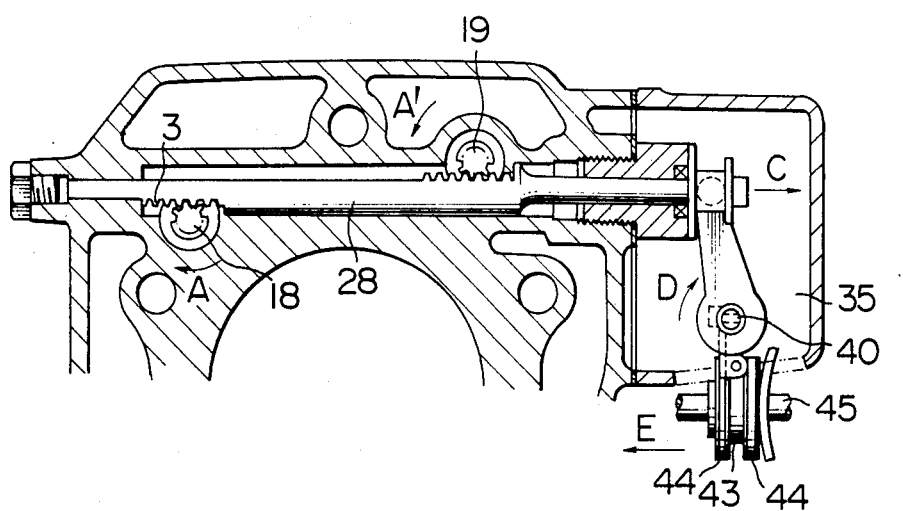

Let us now describe a second embodiment shown in FIG. 6 in which an expansion chamber 21 is communicated with a first expansion passage 23 and a second expansion passage 24 of the cylinder 10 which in turn are communicated with the main exhaust passage 15 through the rotary valves 18 and 19 which can be opened and closed. As shown in FIG. 7, the valves 18 and 19 are located on opposite sides of the rack shaft 28. Thus, as the rack shaft 28 shifts in the direction indicated by the arrow C, the first rotary valve 18 rotates in the direction indicated by the arrow A while the second rotary valve 19 rotates in the direction indicated by the arrow A'. The result of this is that the auxiliary exhaust passages 16 and 17 are closed with respect to the main exhaust passage 15 while the expansion chamber 21 is opened to communicate with the main exhaust passage 15 as shown in FIG. 6.

In the second embodiment of the construction shown in FIG. 6, the expansion chamber 21 is fully open with respect to the main exhaust passage 15 via the passages 23 and 24 when the engine operates in a low engine speed range. This makes it possible to absorb pulsations occurring in exhaust passages, thereby improving the output power of the engine in the low engine speed range. The expansion chamber 21 is successively closed as the rpm. of the engine increases, but the pulsations in the exhaust passages are gradually reduced with an increase in the rpm. of the engine. Thus, an increase in the pulsation can be avoided.

In the embodiments shown in FIGS. 1–6, the system has been shown and described as having two auxiliary exhaust passages. However, the invention is not limited to this specific number of the auxiliary exhaust passages and the number of the auxiliary exhaust passages may be one or three or more. The number of the rotary valves should also be altered to correspond to the number of the auxiliary exhaust passages.

The invention can achieve the following effects. When the engine operates in a low engine speed range, the auxiliary exhaust passages remain closed, so that the exhaust has a small cross-sectional area. However, as the rpm. of the engine increases, the auxiliary exhaust passages are gradually opened and the cross-sectional area of the exhaust successively increases until the cross-sectional area of the exhaust is maximized when the two auxiliary exhaust passages are both fully open as the engine overruns or its speed reaches a highest level. When this condition is achieved, the characteristic of the engine is substantially stabilized and the output power of the engine is markedly improved particularly because of the fact that effective use can be made of the auxiliary exhaust passages in the engine high speed range.

In the system according to the invention, the rotary valves for opening and closing the auxiliary exhaust passages with respect to the main exhaust passage are each in the form of a shaft and located in parallel to the center line of the cylinder of the engine. This arrangement enables the area of the opening of each of the rotary valves to be increased with ease as compared with the arrangement of the rotary valve in the prior art shown in FIG. 8 whereby the rotary valve is located normal to the center line of the cylinder in a position above the main exhaust passage. More specifically, in the system according to the invention, no difficulties are experienced in increasing the diameter of the rotary valves and the axial length of the cutout passages of the valves to increase the area of the opening of each of the rotary valves. An increase in the area of the opening of each rotary valve is conducive to increased efficiency in the use of auxiliary exhaust passages.

In the system according to the invention, the auxiliary exhaust passages are located at opposite sides of the main exhaust passage circumferentially of the cylinder. This arrangement prevents the occurrence of a change in the compression ratio of a fuel-air mixture in the cylinder which might otherwise occur when the auxiliary exhaust passages are opened. Thus, the compression ratio can be kept at a high level even when the engine operates in a high engine speed range, thereby increasing the characteristic of the engine in the high engine speed range.

Having described specific embodiments of our bearing, it is believed obvious that modification and variation of the invention is possible in light of the above teachings.

What is claimed is:

1. An exhaust control system for a two-cycle engine having at least one cylinder comprising:
    a main exhaust passage communicating with said cylinder;
    at least one auxiliary exhaust passage located laterally of said main exhaust passage circumferentially of a cylinder; and
    at least one rotary valve for adjustably opening and closing said auxiliary exhaust passage, said rotary valve being in the form of a shaft located parallel to a center line of the cylinder and interposed between the main exhaust passage and said auxiliary exhaust passage for rotation;
    wherein said auxiliary exhaust passage remains closed with respect to the main exhaust passage when the engine operates at a low engine speed range and is successively opened with respect to the main exhaust passage as the speed of the engine increases.

2. An exhaust control system according to claim 1 wherein said at least one auxiliary exhaust passage communicates at one end with said cylinder and at the other end with said main exhaust passage, and said rotary valve is located at the junction of said auxiliary exhaust passage and said main exhaust passage.

3. An exhaust control system according to claim 1 wherein said rotary valve is rotated by a rack and pinion.

4. An exhaust control system according to claim 1 wherein said at least one auxiliary exhaust passage comprises two auxiliary exhaust passages and said at least one rotary valve comprises two rotary valves.

5. An exhaust control system according to claim 1 wherein rotation of said at least one rotary valve is controlled by governor means.

6. An exhaust control system according to claim 5 wherein said governor means is a centrifugal ball-type governor.

7. An exhaust control system according to claim 1 wherein said engine additionally includes an expansion chamber which communicates with said main exhaust passage through at least one expansion passage.

8. An exhaust control system according to claim 7 wherein said at least one expansion passage comprises two expansion passages.

9. An exhaust control system according to claim 7 wherein said at least one rotary valve additionally serves to open and close said at least one expansion passage in response to engine speed.

10. An exhaust control system according to claim 9 wherein said rotary valve opens communication between said main exhaust passage and said at least one auxiliary exhaust passage as said valve closes communication between said main exhaust passage and said at least one expansion passage.

* * * * *